(12) United States Patent
Joseph Xavier et al.

(10) Patent No.: US 9,180,921 B2
(45) Date of Patent: Nov. 10, 2015

(54) IDLER WHEEL ASSEMBLY

(71) Applicant: Caterpillar Inc., Peoria, IL (US)

(72) Inventors: Martin Tagore Joseph Xavier, Chennai (IN); Daniel I. Knobloch, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 229 days.

(21) Appl. No.: 13/632,847

(22) Filed: Oct. 1, 2012

(65) Prior Publication Data

US 2014/0091616 A1 Apr. 3, 2014

(51) Int. Cl.
*B62D 55/096* (2006.01)
*B62D 55/14* (2006.01)

(52) U.S. Cl.
CPC ............ *B62D 55/0966* (2013.01); *B62D 55/14* (2013.01)

(58) Field of Classification Search
CPC .. B62D 55/14; B62D 55/096; B62D 55/0963; B62D 55/0966
USPC .................. 305/60, 136, 137, 199; 295/7, 11; 301/6.91
See application file for complete search history.

(56) References Cited

U.S. PATENT DOCUMENTS

| | | | | |
|---|---|---|---|---|
| 1,568,456 A | * | 1/1926 | Howard | 301/64.6 |
| 1,689,052 A | * | 10/1928 | Rogers | 295/7 |
| 1,726,385 A | * | 8/1929 | Collins | 152/52 |
| 2,024,375 A | * | 12/1935 | Latshaw | 295/7 |
| 2,065,134 A | * | 12/1936 | Hirshfeld | 295/7 |
| 2,129,178 A | * | 9/1938 | Jordan | 295/7 |
| 2,267,311 A | | 12/1941 | Smith | |
| 2,680,421 A | | 6/1954 | Baker | |
| 3,307,419 A | * | 3/1967 | Brickett et al. | 74/443 |
| 3,689,122 A | * | 9/1972 | Mazzarins | 305/136 |
| 3,937,528 A | * | 2/1976 | Clemens et al. | 305/199 |
| 3,993,356 A | | 11/1976 | Groff | |
| 3,996,810 A | | 12/1976 | Groff | |
| 4,183,572 A | * | 1/1980 | Albrecht et al. | 295/7 |
| 4,332,573 A | * | 6/1982 | Uchida et al. | 474/94 |
| 4,449,756 A | | 5/1984 | Weeks | |
| 4,635,990 A | * | 1/1987 | Golubenko et al. | 295/11 |
| 4,818,041 A | * | 4/1989 | Oertley | 305/137 |
| 4,880,283 A | | 11/1989 | Savage et al. | |
| 5,022,718 A | * | 6/1991 | Diekevers | 305/136 |

(Continued)

FOREIGN PATENT DOCUMENTS

FR 2327910 A1 * 9/1976
FR 2327907 A1 * 5/1977

(Continued)

OTHER PUBLICATIONS

U.S. Appl. No. 13/632,808 by Daniel Knobloch et al. filed Oct. 1, 2012 entitled "Idler Wheel Assembly,".

*Primary Examiner* — Kip T Kotter
(74) *Attorney, Agent, or Firm* — Finnegan, Henderson, Farabow, Garrett & Dunner, LLP

(57) ABSTRACT

An idler wheel assembly for a track-type machine includes a circular body, and a sound dampening member. The circular body includes a central hub portion, an annular flange portion integral with the central hub portion, and a circumferential rim portion to define an annular cavity along with the central hub portion and the annular flange portion. The sound dampening member disposed in the annular cavity and a retainer plate positioned adjacent to the sound dampening member.

12 Claims, 7 Drawing Sheets

(56) References Cited

U.S. PATENT DOCUMENTS

| | | |
|---|---|---|
| 5,040,855 A | 8/1991 | Diekevers |
| 5,511,869 A | 4/1996 | Edwards et al. |
| 5,997,109 A | 12/1999 | Kautsch |
| 6,012,784 A * | 1/2000 | Oertley .......................... 305/137 |
| 6,312,033 B1 * | 11/2001 | Engstler .......................... 295/11 |
| 6,406,029 B1 | 6/2002 | Kupper et al. |
| 6,631,961 B1 | 10/2003 | Bedford et al. |
| 7,201,242 B2 | 4/2007 | Tucker, Jr. |
| 8,360,535 B2 * | 1/2013 | Johannsen et al. ............ 305/137 |
| 8,770,677 B2 | 7/2014 | Yelistratov |
| 2005/0189812 A1 | 9/2005 | Hogan |
| 2011/0305865 A1 | 12/2011 | Cocconi et al. |

FOREIGN PATENT DOCUMENTS

| | | |
|---|---|---|
| JP | 3123417 U * | 7/2006 |
| KR | 2002-0001316 | 1/2002 |
| WO | WO 03/018388 | 3/2003 |

* cited by examiner

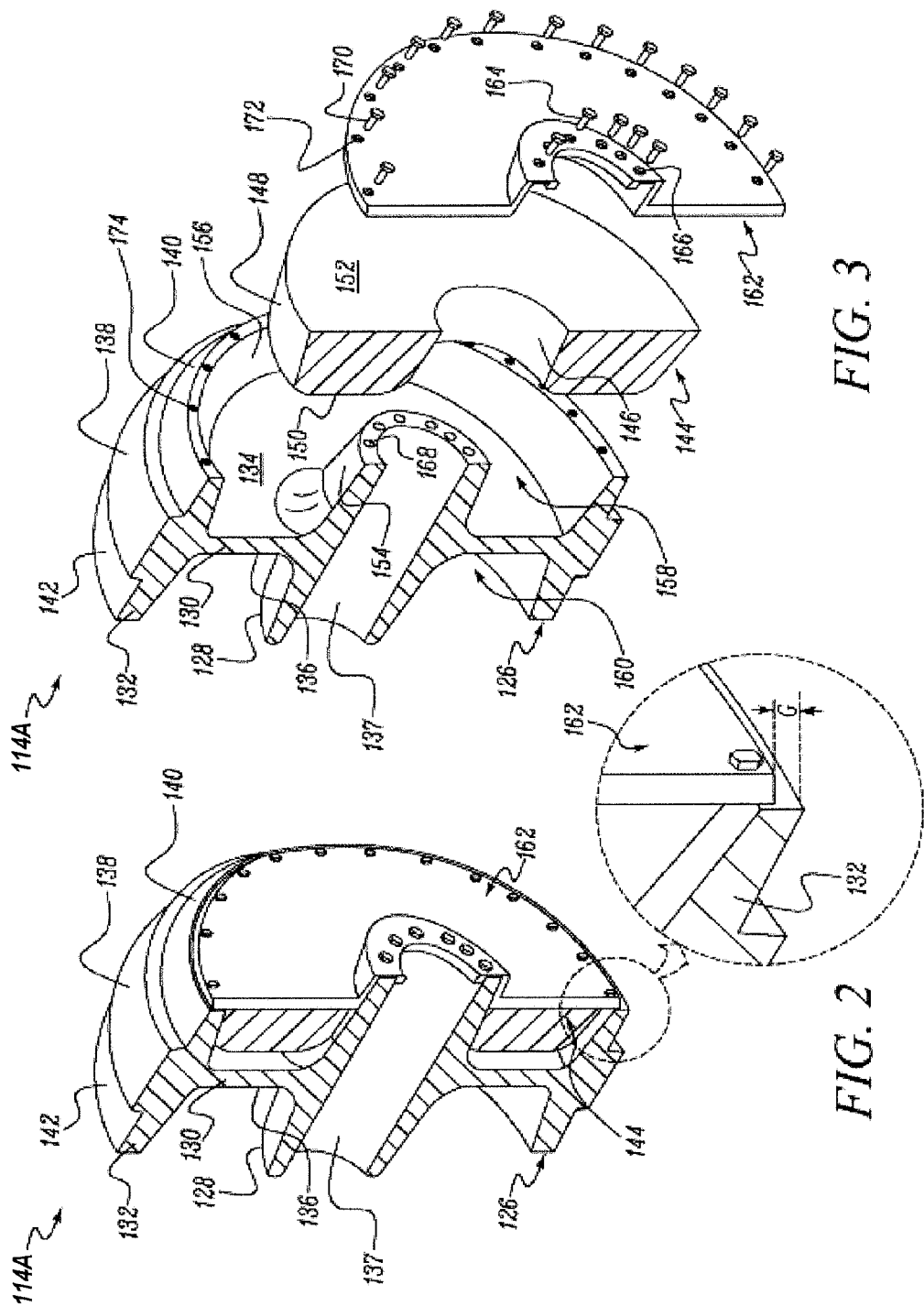

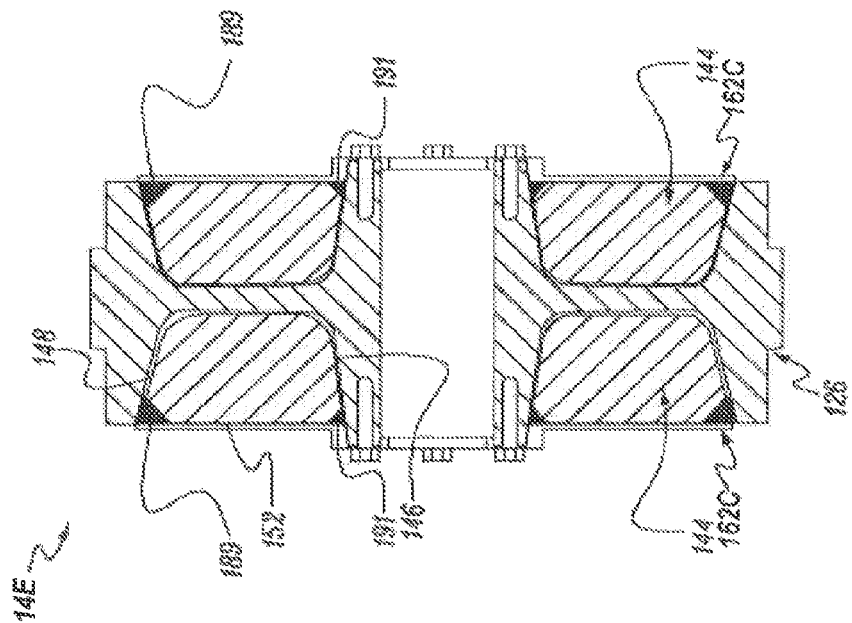
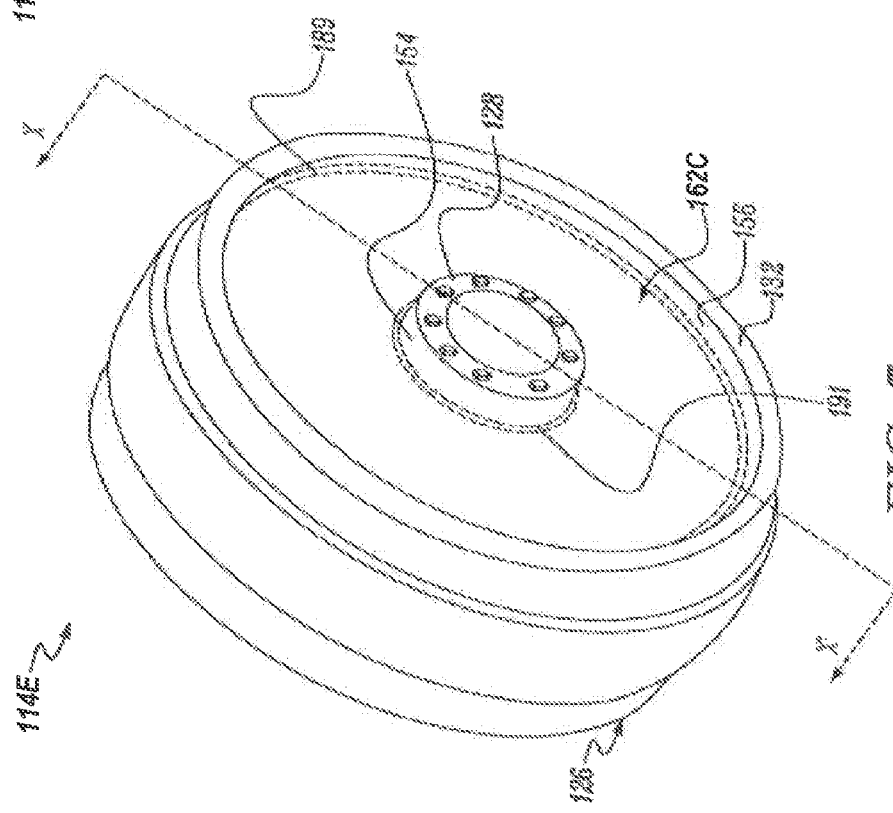
FIG. 7
FIG. 8

IDLER WHEEL ASSEMBLY

TECHNICAL FIELD

The present disclosure relates to an idler wheel assembly for a track-type machine, and more particularly to an idler wheel assembly having a sound dampening feature.

BACKGROUND

Earthmoving and construction vehicles which utilize self-laying endless tracks for support and propulsion generally include one or more idler wheels for guiding and supporting the tracks. The tracks include metal connecting links, which on contact with metal tread portions of the idler wheel during the track guiding, generate noise and vibration due to the metal to metal contact of the moving components.

U.S. Pat. No. 4,818,041 discloses an idler wheel assembly for a track-type machine having a hub member and a plurality of replaceable wear segments positioned around the circumference of the hub. Further, a plurality of U-shaped grooves provided on the circumferential surface of the hub to receive resilient means. The wear segments also fit within the grooves and hold the resilient means in place. A plurality of clamping members encircle the hub, overlap the wear segments, and clamp the resilient means between the wear segments and the grooves as they are secured to the hub. The wear segments are therefore resiliently isolated from the idler hub.

SUMMARY

In one aspect, the present disclosure provides an idler wheel assembly for a track-type machine. The idler wheel assembly includes a circular body, and a sound dampening member. The circular body includes a central hub portion, an annular flange portion integral with the central hub portion, and a circumferential rim portion. The circumferential rim portion may define an annular cavity along with the central hub portion and the annular flange portion. The sound dampening member disposed in the annular cavity and a retainer plate positioned adjacent to the sound dampening member.

In another aspect, the present disclosure provides an idler wheel assembly for a track-type machine may have a sound dampening coating provided on the circular body. The sound dampening coating may be polyurethane.

Other features and aspects of this disclosure will be apparent from the following description and the accompanying drawings.

BRIEF DESCRIPTION OF THE DRAWINGS

FIG. 2 is cross-sectional view in perspective of the idler wheel assembly, according to an aspect of the of the present disclosure;

FIG. 3 is a cross-sectional view in perspective of the idler wheel assembly of FIG. 2, in exploded position;

FIG. 7 is a perspective view the idler wheel assembly, according to yet another embodiment of the present disclosure;

FIG. 8 is a cross-sectional view the idler wheel assembly of FIG. 7;

DETAILED DESCRIPTION

Figure 1:
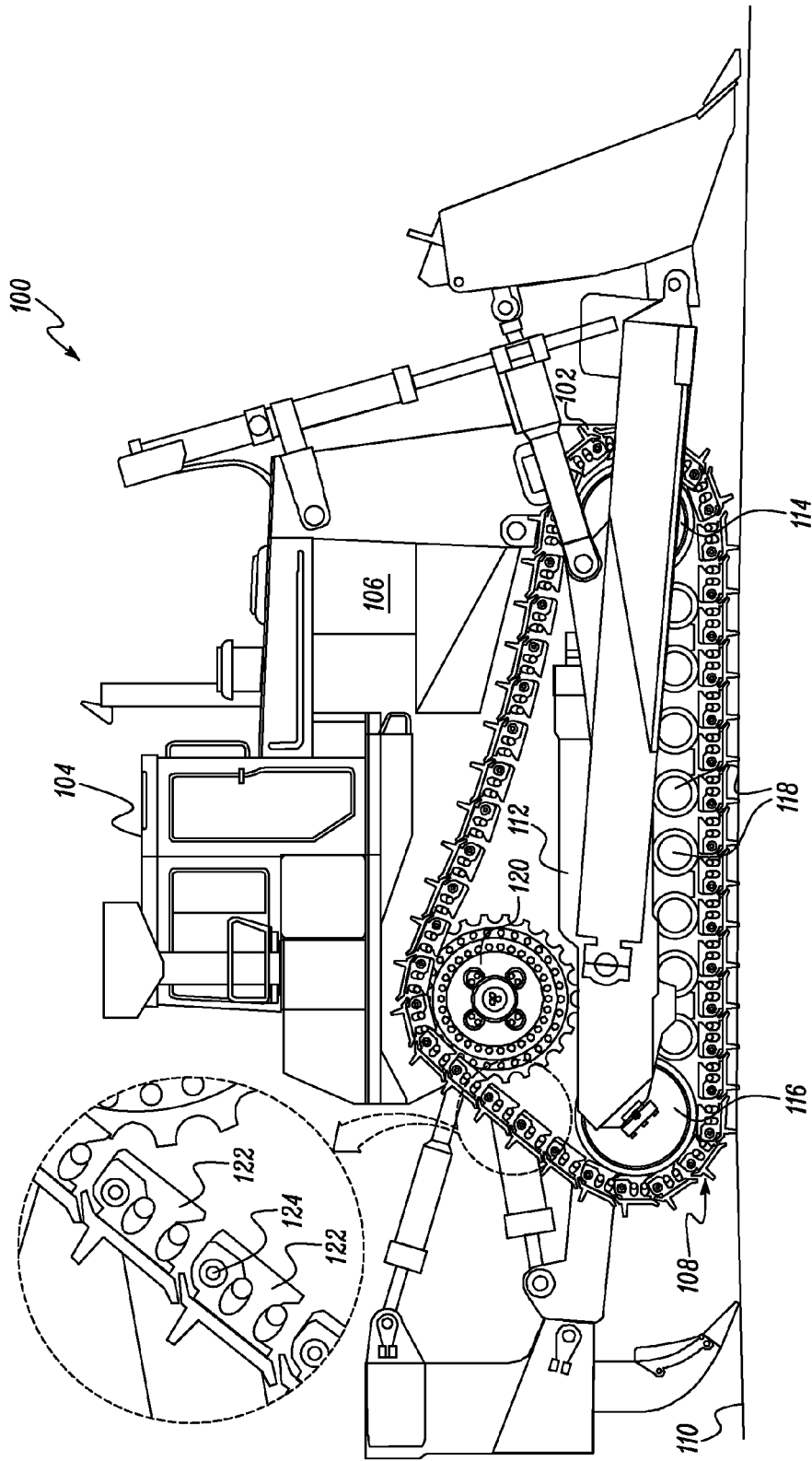
FIG. 1 is a side view of a machine incorporating an idler wheel assembly.

FIG. 1 illustrates a side view of a machine 100, such as a track type tractor, in which various embodiments of the present disclosure may be implemented. Although, the machine 100 is embodied as the track type tractor, the machine 100 may be, but not limited to, a track type loader, a material handler, an excavator, a dozer, a compact track and multi terrain loader, or any other track-type vehicle or machine. The machine 100 may be used for lifting and/or handling a load and may be employed in various industries such as, but not limited to, construction and mining.

In an exemplary embodiment, as illustrated in FIG. 1, the machine 100 may include a frame 102 to support an operator cab 104, and an engine enclosure 106. As well known in the art, an engine (not shown) may be housed within the engine enclosure 106. The engine is used to provide power to a final drive assembly, via a mechanical or an electrical transmission. Further, the operator cab 104 may include one or more control means to control the operations of the machine 100.

The machine 100 may include ground engaging elements, such as a pair of tracks 108 (only one side is shown) mounted on the frame 102. The tracks 108 may support the machine 100 on a ground 110. As illustrated the frame 102 may further include a sub-frame 112, which in turn supports a front and a rear idler wheel assemblies 114 and 116, as well as a plurality of guide roller assemblies 118. The track 108 is driven by a powered sprocket 120 and encircles the idler wheel assemblies 114, 116 and the guide roller assemblies 118. While only a portion of the tracks 108 is illustrated in detailed, it will be understood that, the each of the tracks 108 may include a plurality of links 122 connected by respective transverse pins 124 to form an endless loop around the idler wheel assemblies 114, 116 and the powered sprocket 120. The front and rear idler wheel assemblies 114 and 116 are substantially similar and, therefore, for the purpose of the present disclosure, only the front idler wheel assembly 114 will be described in detail hereinafter.

FIGS. 2-12 depict various embodiments of the front idler wheel assembly 114. FIG. 2 illustrates a cross-sectional view in perspective of an idler wheel assembly 114A, according to an aspect of the present disclosure. Further, FIG. 3 illustrates a cross-sectional view in perspective of the idler wheel assembly 114A of FIG. 2 with several components in exploded position. With reference to FIGS. 2 and 3, the idler wheel assembly 114A, which supports and guides the tracks 108, includes a circular body 126 include a central hub portion 128, an annular flange portion 130 integral with the central hub portion 128, and a circumferential rim portion 132. The annular flange portion 130 may include a first side surface 134 and a second side surface 136, and joins the circumferential rim portion 132 to the central hub portion 128. The central hub portion 128 may include a through opening 137 configured to receive a shaft along with one or more support bearings (not shown) while attaching to the sub-frame 112. The circumferential rim portion 132 may include a central support surface 138, a first treat surface 140, and a second treat surface 142. The first and the second treat surfaces 140, 142 are configured to contact the links 122 of the tracks 108, while the central support surface 138 is configured to contact with bushings/bearings associated with the transverse pins 124 provided between the links 122 of the tracks 108.

According to some embodiments of the present disclosure, the idler wheel assembly 114 may include a sound dampening member 144. The sound dampening member 144 may be made of a natural or a synthetic rubber, thermosetting plastics, composites, polymeric material or any other material having sound absorbing properties known in the art. The sound dampening member 144 may have an annular shape of a substantially trapezoidal cross-section with an inner circumferential surface 146 and an outer circumferential surface 148. The sound dampening member 144 may also include a first surface 150 and a second surface 152 axially spaced with respect to each other. Alternatively, according to various other embodiments of the present disclosure, the sound dampening member 144 may have any other suitable cross-section such as T-shape, C-shape etc.

As illustrated in FIG. 3, the inner circumferential surface 146 of the sound dampening member 144 is configure to partially enclose an outer surface 154 of the central hub portion 128. Further, the outer circumferential surface 148 of the sound dampening member 144 is configured to contact an inner surface 156 of the circumferential rim portion 132. Furthermore, the first surface 150 of the sound dampening member 144 is configured to contact the first side surface 134 of the annular flange portion 130. Moreover, it will be apparent to a person having ordinary skill in the art that, the sound dampening member 144 is substantially disposed in a first annular cavity 158 defined by the central hub portion 128 and the circumferential rim portion 132 of the circular body 126. As illustrated in FIG. 3, the first annular cavity 158 may be formed by the first side surface 134, the inner surface 156 of the circumferential rim portion 132, and the outer surface 154 of the central hub portion 128. Further, it will be apparent that a second annular cavity 160, similar to the first annular cavity 158, may be also defined on other side of the of the annular flange portion 130.

The idler wheel assembly 114, according to some embodiments of the present disclosure, may further include a retainer plate 162, positioned adjacent to the sound dampening member 144. The retainer plate 162 may have a substantially circular shape which overlaps the sound dampening member 144, the circumferential rim portion 132, and the central hub portion 128 of the circular body 126. In an embodiment, the retainer plate 162 may be made of a steel sheet, aluminum sheet, other metallic alloys sheet, composites or polyurethane based polymeric sheet. Further, the retainer plate 162 may be a galvanized and/or PVC coated. In another embodiment, the retainer plate 162 may have mesh like structure made of a metal, composite, polymeric, or wire material. The retainer plate 162 is configure to be attached with the second surface 152 of the sound dampening member 144 by adhesive bonding, ultrasonic welding, or any other well-known method in the art. Further, the retainer plate 162 is configured to rigidly attach to the central hub portion 128 of the circular body 126, using a first set of mechanical fasteners 164, such as but not limited to, bolts.

Figure 4:
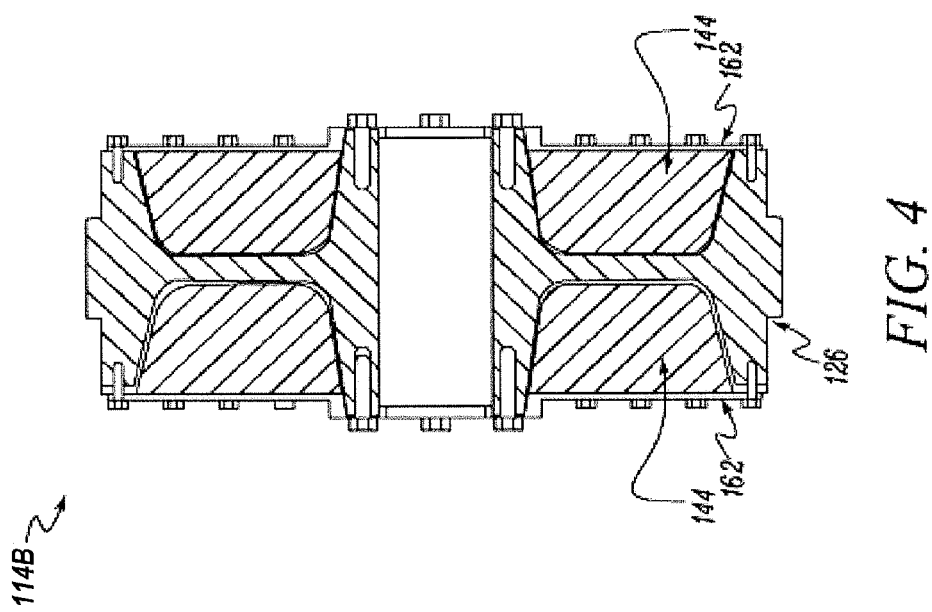
FIG. 4 is a cross-sectional view the idler wheel assembly, according to another embodiment of the present disclosure.

As illustrated in FIG. 3, the first set of mechanical fasteners 164 are configure to be received in a plurality of uniformly disposed and aligned threaded openings 166, 168 provided on the retainer plate 162 and the central hub portion 128, respectively. Furthermore, the retainer plate 162 may be configured to rigidly attach to the circumferential rim portion 132, using a second set of mechanical fasteners 170. The second set of mechanical fasteners 170 may be substantially similar to the first set of mechanical fasteners 164 and configured to be received in a plurality of uniformly disposed and aligned threaded openings 172, 174 provided on the retainer plate 162 and the circumferential rim portion 132, respectively. Moreover, in various other embodiments, a gasket member made of a resilient material such as, an adhesive layer, a sound-attenuating dampening film, or a rubber gasket may be used in between the retainer plate 162 and the circumferential rim portion 132. Further, as illustrated in FIG. 2, an outside diameter of the retainer plate 162 may be relatively smaller than an outer diameter of the circumferential rim portion 132 at the first treat surface 140 to provide a gap G. The gap G provides protection to the retainer plate 162 due to any wear of the first and/or second treat surfaces 140, 142, without causing any substantial wear to the retainer plate 162. According to another embodiment, a cross-sectional view of an idler wheel assembly 114B is illustrated in FIG. 4, two sound dampening members 144, along with respective retainer plates 162, may be disposed in the first and second annular cavities 158, 160 provided on both sides of the annular flange portion 130.

Figure 6:
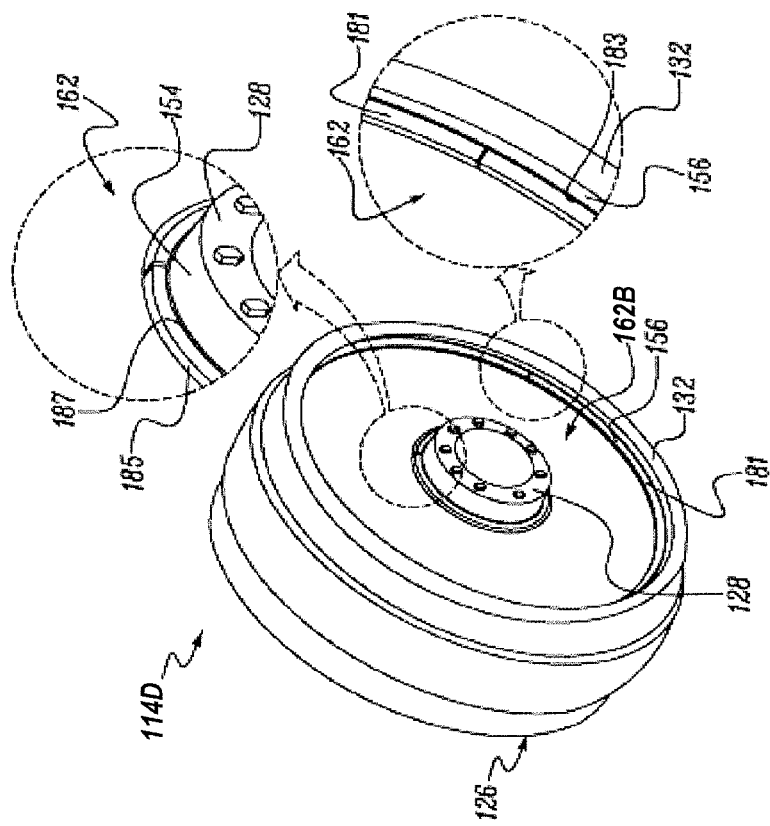
FIG. 6 is a perspective view the idler wheel assembly, according to yet another embodiment of the present disclosure.
Figure 5:
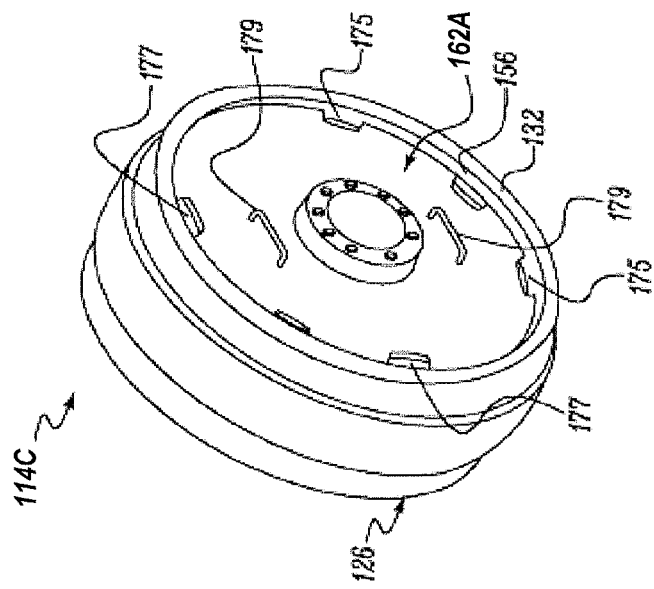
FIG. 5 is a perspective view the idler wheel assembly, according to another embodiment of the present disclosure.

FIGS. 5 to 8 illustrate various other alternative embodiments to attach the retainer plate 162 (including retainer plates 162A, 162B, and 162C) with the circular body 126 of idler wheel assemblies 114C, 114D, and 114E. As illustrated in FIG. 5, according to an embodiment of the present disclosure, one or more retaining tabs 175 are provided on the circumferential rim portion 132 in idler wheel assembly 114C. The retaining tabs 175 are configured to lock the retainer plate 162A over the first and/or second annular cavities 158, 160. The retaining tabs 175 may protrude radially inward from the inner surface 156 of the circumferential rim portion 132. The retainer plate 162A may be provided with one or more cutouts 177 and two of more handle 179 such that an operator may hold and slide-in the retainer plate 162A over the retaining tabs 175 through the cutouts 177 while assembling. Further, using the handles 179 the retainer plate 162A is rotated to be firmly locked by the retaining tabs 175. Referring to FIG. 6, according to yet another embodiment, a first retaining ring 181 may be provided to hold the retainer plate 162B in the first and/or second annular cavities 158, 160. The first retaining ring 181 may be a split ring made of a resilient material which is partially received in a first annular groove 183 provided on the inner surface 156 of the circumferential rim portion 132 and configured to circumferentially lock the retainer plate 162B. Further, the idler wheel assembly 114D may also include a second retaining ring 185, also a split ring made of a resilient material, which is partially received in a second annular groove 187 provided on the outer surface 154 of the central hub portion 128 and also configured to circumferentially lock the retainer plate 162B.

According to yet another embodiment, as illustrated in FIGS. 7 and 8, the retainer plate 162C may be welded with the inner surface 156 of the circumferential rim portion 132 and the outer surface 154 of the central hub portion 128 by a first welded portion 189 and a second welded portion 191, respectively. As illustrated in FIG. 8, a sectional view of the idler wheel assembly 114E of FIG. 7 along a line XX', annular chamfered surfaces are provided on the inner circumferential surface 146 and outer circumferential surface 148 of the second surface 152 of the sound dampening member 144 to accommodate the first and the second welded portions 189, 191, respectively. Moreover, a person having ordinary skill in the art will understand that the various method of attaching the retainer plate 162 (including retainer plates 162, 162A, 162B, and 162C) with the circular body 126 as illustrated in FIGS. 2 to 8 are exemplary in nature, and any suitable process or technique known on the art may be used to attach the retainer plate 162 with the with the circular body 126.

Figures 9, 10:
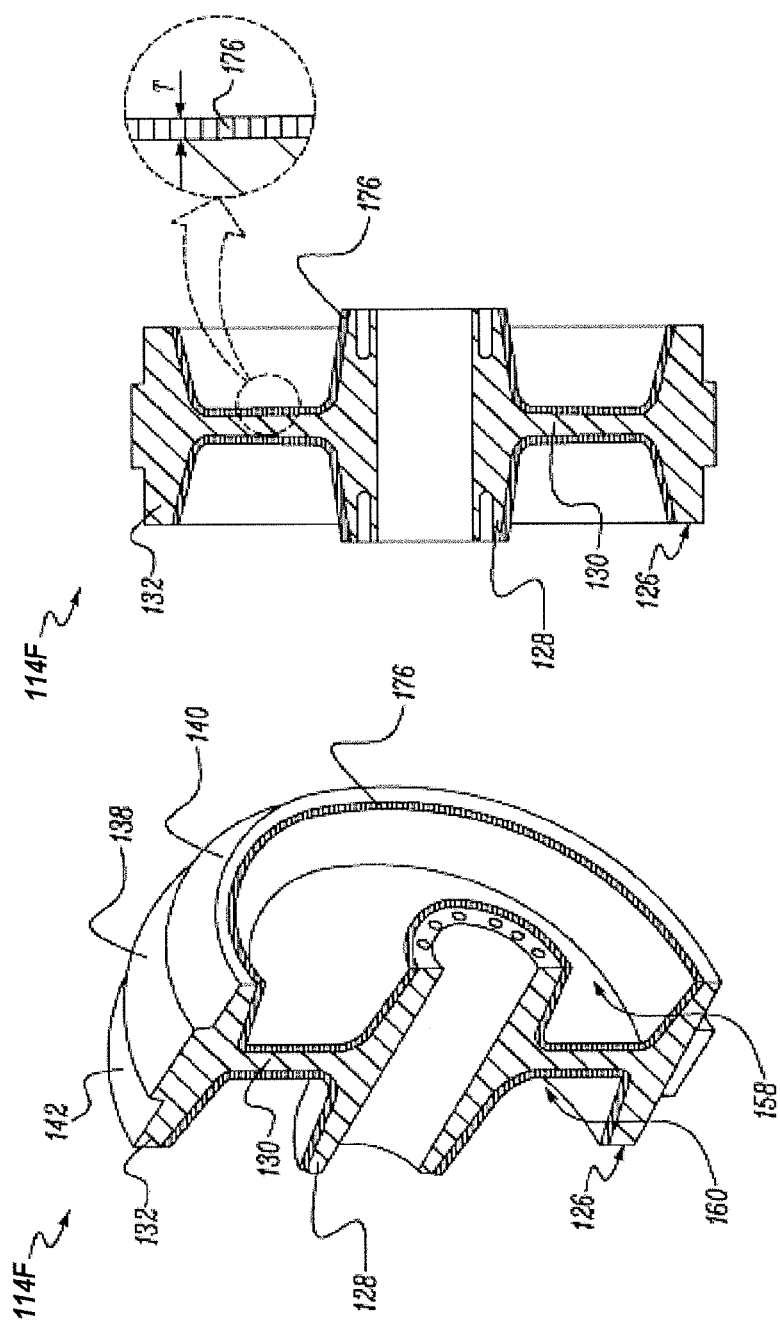
FIG. 9 is a cross-sectional view in perspective of the idler wheel assembly, according another aspect of the present disclosure.
FIG. 10 is a cross-sectional view of the idler wheel assembly of FIG. 9.

FIG. 9 illustrates a cross-sectional view in perspective of an idler wheel assembly 114F with a sound dampening coating 176, according another aspect of the present disclosure. As illustrated in FIG. 9, the sound dampening coating 176 may be provided on the circular body 126. Alternatively, the sound dampening coating 176 may be selectively provided on the inner surface 156 of the circumferential rim portion 132, the first and the second side surfaces 134, 136, and the outer surface 154 of the central hub portion 128. The sound dampening coating 176 may be of a natural or a synthetic rubber, thermosetting plastics, composites, polymeric material or any other material having sound absorbing properties known in the art.

According to an embodiment of the present disclosure, the sound dampening coating 176 may be of polyurethane, for example, but not limited to, a polyether-based polyurethane (e.g. PPG or PTMEG type) formed by reaction between ether polyols or ether glycols with an isocyanate, such as, diphenylmethane diisocyanate (MDI). In various other embodiments, the sound dampening coating 176 may of polyurea or polyurethane/polyurea hybrid composites. The sound dampening coating 176 may have suitable heat resistant, ozone or weather resistant, aqueous fluid resistant, low temperature resistance, and adhesion to rigid substrate properties. According to an embodiment of the present disclosure, the sound dampening coating 176 may have a hardness in the range from about 50 Shore A to about 80 Shore D, or more preferably from about 75 Shore A to about 55 Shore D, about 15 MPa minimum tensile strength, and density in a range of about 1.0 g/cc to 3.0 g/cc. In an embodiment, the sound dampening coating 176 may have ASTM D-2000 requirement: M5BG 920 A14C36EA13014F38K211.4Z1 with the density of the sound dampening coating 176 may be about 1.2 g/cc.

In various other embodiments, the sound dampening coating 176 may be formulated with one or more fillers in the polyurethane to improve sound/vibration attenuation. The fillers may include high density fillers such as barium sulfate, zinc oxide, gypsum, zinc sulfide, antimony trioxide, metallic particles, or the like. In an embodiment, the sound dampening coating 176 may be formulated with a mixture of the high density fillers and low density void forming fillers in the polyurethane. The low density void forming fillers may include glass microspheres, polymeric microspheres, or ground foam particles. Alternatively, voids may be selectively formed in the polyurethane by chemical blowing agents, $CO_2$ injection, or introducing some water into the polyurethane mixture which is known to generate $CO_2$ as a byproduct when reacting with the isocyanates present in the in the polyurethane. A thixotropic material or gel based agent may optionally be added in the polyurethane to avoid any stratification of the high density filler particulate and the low density void forming material in the polyurethane. Alternatively, the sound dampening coating 176 may be of synthetic/natural polymers, composites having properties similar to the above mentioned properties.

The sound dampening coating 176, in the form of liquid state processed polyurethane primarily including isocyanate solution and polyol solution, may be applied on the idler wheel assembly 114F using a variety of techniques, such as, but not limited to, centrifugal molding, vacuum casting, injection molding, spraying, and rotational casting. The coating process may include a pre-surface preparation including one or more of the sand blasting, shot blasting, acid etching techniques or the like to remove any contamination, and corrosion products. In an aspect of the present disclosure, during the casting process a mold may be utilized, such that the liquid state processed polyurethane is forced into the mold under a pre-determined pressure and temperature. During the casting process the air present inside the mold may be displaced and forced out. Following the casting process the polyurethane is cured in an oven/furnace to solidify and form a rigid coating on the idler wheel assembly.

Figures 11, 12:
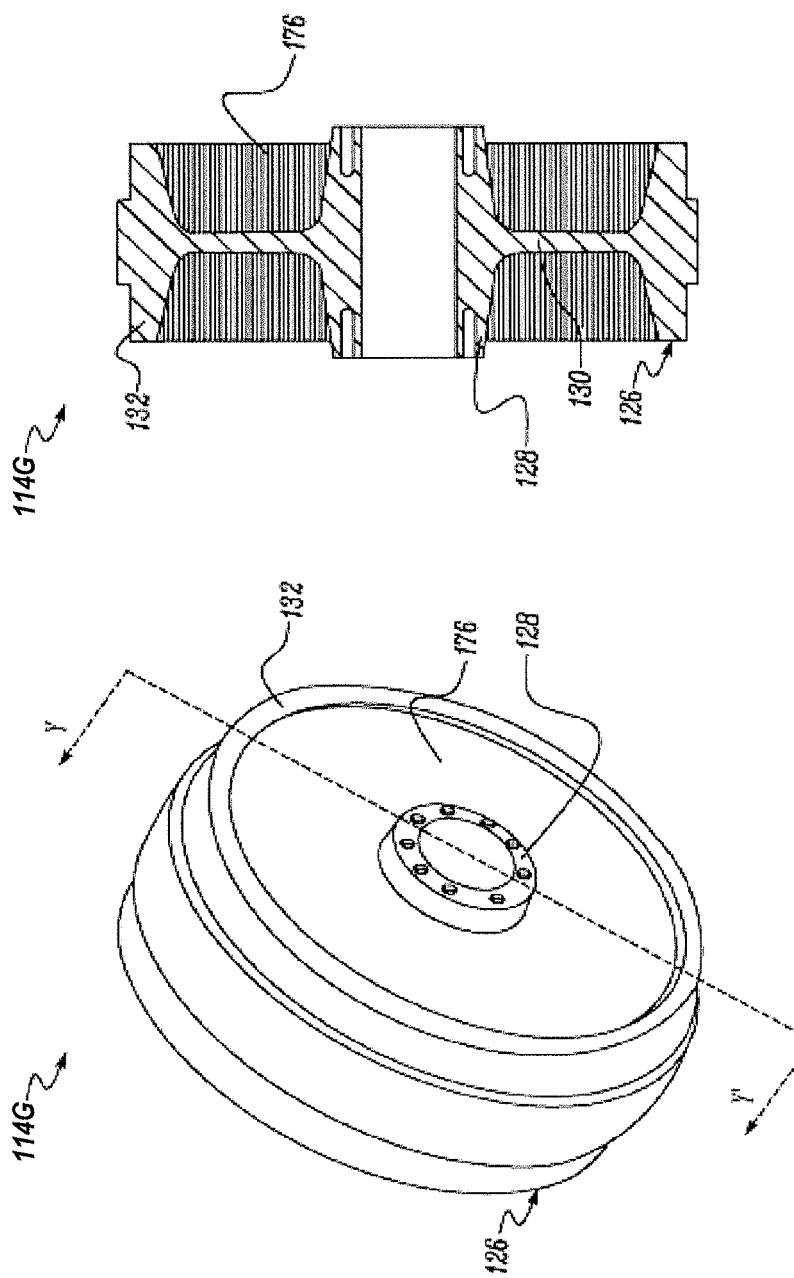
FIG. 11 is a perspective view of the idler wheel assembly, according yet another aspect of the present disclosure.
FIG. 12 is a cross-sectional view of the idler wheel assembly of FIG. 11.

As illustrated in FIG. 10, a cross-sectional view of the idler wheel assembly 114F of FIG. 9, the sound dampening coating 176 may be applied on the first and second side surfaces 134, 136, the inner surface 156 of the circumferential rim portion 132, and the outer surface 154 of the central hub portion 128 with a substantially uniform thickness T. The thickness T of the sound dampening coating 176 may lie in a range of about 8 mm to 15 mm. In an aspect of the present disclosure, the thickness T of the sound dampening coating 176 may be about 10 mm. It will apparent to a person having ordinary skill in the art that, the thickness T of the sound dampening coating 176 described above is exemplary in nature and may vary be based on the application and design requirements of the idler wheel assembly 114. Moreover, in another aspect of the present disclosure, as illustrated in FIG. 11, in an idler wheel assembly 114G the polyurethane based sound dampening coating 176 may be cast in-place or post installed to substantially fill the annular cavities 158, 160 defined by the central hub portion 128 and the circumferential rim portion 132 of the circular body 126. FIG. 12 illustrates a sectional view of the idler wheel assembly 114G of FIG. 11 along a line YY'. Further, in various other embodiments of the present disclosure, a cover plate having substantially similar shape and material properties as of the retainer plate 162 (see FIGS. 2 to 8) may be used with the idler wheel assemblies 114F, 114G having the polyurethane coating 176, as illustrated in FIGS. 9 to 12. Moreover, the cover plate may be attached to the central body portion 126 using the any known methods in the art including the above mentioned methods in conjunction with FIGS. 2 to 8.

INDUSTRIAL APPLICABILITY

The industrial applicability of the idler wheel assembly having a sound dampening features described herein will be readily appreciated from the foregoing discussion. The idler wheel assemblies 114, 116 are particularly useful with earth-moving and construction machines and specifically, self-laying track-type machines, such as the machine 100. During propulsion of the machine 100, power from the engine is transmitted to the power sprocket 120 which rotates and drives the track 108 around the idler wheel assemblies 114, 116 and the guide roller assemblies 118. As the track 108 contacts the idler wheel assemblies 114, 116 noise and vibration are generated.

In an aspect of the present disclosure, the sound dampening member 144 rigidly held in at least one of the first and the second annular cavities 158, 160 by the retainer plate 162 may help to absorb noise and vibrations. The circumferential rim portion 132 is isolated from the central hub portion 128 by the sound dampening member 144, such that the noise and vibration are not transferred into the central hub portion 128, where it may be amplified and transferred further to the other components. In another aspect of the present disclosure, the sound dampening coating 176 may absorb energy carried by the noise, generated by the contact of the track 108 and the idler wheel assemblies 114, 116, to provide a barrier against unwanted sound. The sound dampening coating 176 may also improve resistance to corrosive environments, and resistance to abrasion of the idler wheel assemblies 114, 116. Further, the high density fillers may provide a corrosion-free sound dampening coating 176 and also reduces the speed of sound through the sound dampening coating 176. Furthermore, the low density void forming fillers may attenuate sound through intrinsic dissipation, and scattering of sound.

Moreover, the sound dampening member 144 and the sound dampening coating 176 are not in direct contact to a moving metal surface, this also improves life expectancy of the sound dampening member 144 and the sound dampening coating 176. This also improves the overall service life of the idler wheel assembly 114, 116. Furthermore, as the noise level produced by contact between the idler wheel assemblies 114, 116 and the track 108 is lower, workers may operate closer to the machine 100, the machine 100 may operate in buildings and other structures without being objectionable, and also meet regime enforced noise control regulation. Also, because the vibrations are damped, life of the track 108 and other components associated with the machine 100 may be prolonged.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. An idler wheel assembly for a track-type machine comprising:
    a circular body including:
    a central hub portion;
    an annular flange portion integral with the central hub portion; and
    a circumferential rim portion to define an annular cavity along with the central hub portion and the annular flange portion;
    a sound dampening member disposed in the annular cavity; and
    a retainer plate positioned adjacent to the sound dampening member,
    wherein the retainer plate is attached to the central hub portion and the circumferential rim portion of the circular body by welding at a welded portion, and
    wherein the sound dampening member includes an annular chamfered surface at a circumferential surface thereof to accommodate the welded portion.

2. The idler wheel assembly of claim 1, wherein the sound dampening member is made of at least one of a natural rubber, a synthetic rubber, a thermosetting plastic, a composite, or a polymeric material.

3. The idler wheel assembly of claim 1, wherein the sound dampening member having an annular shape of substantially trapezoidal cross-section with an inner circumferential surface, an outer circumferential surface, a first surface, and a second surface axially spaced with respect to the first surface.

4. The idler wheel assembly of claim 3, wherein the inner circumferential surface of the sound dampening member partially encloses an outer surface of the central hub portion.

5. The idler wheel assembly of claim 3, wherein the outer circumferential surface of the sound dampening member contacts an inner surface of the circumferential rim portion.

6. The idler wheel assembly of claim 3, wherein the first surface of the sound dampening member contacts a first side surface of the annular flange portion.

7. The idler wheel of claim 1, wherein the sound dampening member is insertable into the annular cavity as one piece.

8. A wheel assembly for supporting and guiding a track of a track-type machine comprising:
    a circular body including:
    a central hub portion having an outer surface;
    an annular flange portion integral with the central hub portion having a first side surface and a second side surface;
    a circumferential rim portion having an inner surface and joined to the central hub portion by the first side surface and the second side surface of the annular flange portion;
    a first annular cavity defined by the outer surface of the central hub portion, the first side surface of the annular flange portion, and the inner surface of the circumferential rim portion; and
    a second annular cavity defined by the outer surface of the central hub portion, the second side surface of the annular flange portion, and the inner surface of the circumferential rim portion;
    a sound dampening member disposed in one of the first annular cavity and the second annular cavity, wherein the sound dampening member is insertable into the first annular cavity or the second annular cavity as one piece; and
    a retainer plate positioned adjacent to the sound dampening member,
    wherein the retainer plate is attached to the central hub portion of the circular body by welding at a first welded portion and attached to the circumferential rim portion of the circular body by welding at a second welded portion, and
    wherein the sound dampening member includes a first annular chamfered surface at an inner circumferential surface thereof to accommodate the first welded portion and a second annular chamfered surface at an outer circumferential surface thereof to accommodate the second welded portion.

9. The wheel assembly of claim 8, wherein the sound dampening member is made of at least one of a natural rubber, a synthetic rubber, a thermosetting plastic, a composite, or a polymeric material.

10. The wheel assembly of claim 9, wherein an inner circumferential surface of the sound dampening member partially encloses the outer surface of the central hub portion.

11. The wheel assembly of claim 9, wherein an outer circumferential surface of the sound dampening member contacts the inner surface of the circumferential rim portion.

12. The wheel assembly of claim 9, wherein a first surface of the sound dampening member contacts at least one of the first side surface or the second side surface of the annular flange portion.

* * * * *